(12) United States Patent
Cooper et al.

(10) Patent No.: US 8,488,587 B1
(45) Date of Patent: Jul. 16, 2013

(54) METHOD AND APPARATUS PERFORMING AUTOMATIC RESOURCE DISTRIBUTION

(75) Inventors: Robert S. Cooper, Irmo, SC (US); Russ Innes, Sunnyvale, CA (US); Sergey A. Razin, Columbia, SC (US); Derek Scott Sanders, Columbia, SC (US); Ken Smith, Lexington, SC (US); Richard Ulmer, Columbia, SC (US); Laura Wilson, Antioch, CA (US)

(73) Assignee: Avaya Inc., Basking Ridge, NJ (US)

( * ) Notice: Subject to any disclaimer, the term of this patent is extended or adjusted under 35 U.S.C. 154(b) by 1506 days.

(21) Appl. No.: 12/060,411

(22) Filed: Apr. 1, 2008

Related U.S. Application Data (60) Provisional application No. 60/921,639, filed on Apr. 2, 2007.

(51) Int. Cl.
*H04L 12/28* (2006.01)

(52) U.S. Cl.
USPC .......................................... 370/351

(58) Field of Classification Search
None
See application file for complete search history.

(56) References Cited

U.S. PATENT DOCUMENTS

| | | | |
|---|---|---|---|
| 6,047,323 A * | 4/2000 | Krause | 709/227 |
| 2003/0023727 A1* | 1/2003 | Hunt et al. | 709/225 |
| 2005/0041788 A1* | 2/2005 | Jan et al. | 379/88.18 |
| 2005/0053217 A1* | 3/2005 | Reformato et al. | 379/211.01 |
| 2005/0065790 A1* | 3/2005 | Yacoub | 704/231 |
| 2005/0276391 A1* | 12/2005 | Ibbotson et al. | 379/88.01 |
| 2011/0054905 A1* | 3/2011 | Lagadec et al. | 704/270 |

* cited by examiner

*Primary Examiner* — Otis L Thompson, Jr.
(74) *Attorney, Agent, or Firm* — Anderson Gorecki & Rouille LLP (57) ABSTRACT

A method, apparatus and computer program product for providing automatic resource distribution is presented. A number of ports of a resource to hold (H) as needed for each Multi Media Platform (MPP) is determined. Further, the maximum number of ports of a resource that can be acquired (M)—M–H of which are borrowed from other MPPs—for each MPP is also determined. The ports are then allocated for an MPP from at least one server in accordance with the number of ports to hold as needed and the number of ports that can be borrowed.

21 Claims, 8 Drawing Sheets

METHOD AND APPARATUS PERFORMING AUTOMATIC RESOURCE DISTRIBUTION

CROSS REFERENCE TO RELATED APPLICATIONS

The present application claims the benefit of U.S. Provisional Patent Application No. 60/921,639, filed on Apr. 2, 2007, which is incorporated herein by reference in its entirety.

BACKGROUND

A voice portal is a system which can be accessed entirely by voice. Ideally, any type of information, service, or transaction found on the Internet could be accessed through a voice portal. A mobile user with a cellular telephone might dial in to a voice portal application and request information using voice or touchtone keys and receive the requested information either via audible prompt, via synthesized text to speech or via some form of display (text message, window pop up on a PDA, etc. Depending on the user's needs, voice portals may automate phone based access to an information resource—from email systems, internet sites, databases, flat files, etc—or it may assist in routing a caller to a specific human resource—for example, someone in customer service.

There are two major categories of voice portals—consumer voice portals and enterprise voice portals. Consumer voice portals focus on giving the user access to information which is general in nature such as weather, sports scores and stock quotes. This information can generally be accessed via Internet protocols such as http and web services. Enterprise voice portals provide customized access to information more useful to employees such as email, calendaring, inventory levels, etc. Both types of voce portals can also route calls to human resources as well. In the case of a consumer oriented voice portal, the person may be a customer support or sales person, in the case of an enterprise voice portal this may be a college or sales lead. Both types rely heavily on resources such as ASR (automatic speech recognition) and TTS (text to speech).

Enterprise voice portals typically interoperate with the enterprise PBX and may use communication protocols specific to a particular PBX or call center. Hosted versions may use SS7 or IMS (IP Multimedia Subsystem) to ease integration issues and provide support for TDM (time division multiplexing) and VoIP (Voice over Internet protocol). A conventional voice portal may include one or more Automated Speech Recognition (ASR) systems and/or one or more Text-To-Speech (TTS) systems.

While the following description gives examples using resources such as ASR resources and TTS resources, the present invention should not be limited to only ASR and TTS resources. Other resources, including but not limited to, video resources, speaker verification resources, telephony ports and network bandwidth are also within the scope of the present invention.

ASR is a technology that allows users of information systems to speak entries rather than punching numbers on a keypad. ASR is can be used in place of keypad entry but is practically required whenever the input data would is complex in nature. In recent years, ASR has become popular in the customer service departments of large corporations ASR is also used by some government agencies and other organizations. Basic ASR systems recognize single-word entries such as yes-or-no responses and spoken numerals. This makes it possible for people to work their way through automated menus without having to enter dozens of numerals manually or when a hands free interface is required. In a manual-entry situation, a customer might hit the wrong key after having entered several numerals at intervals previously in the menu, and give up rather than call again and start over. ASR virtually eliminates this problem.

Sophisticated ASR systems allow the user to enter direct queries or responses, such as a request for driving directions or the telephone number of a hotel in a particular town. This shortens the menu navigation process by reducing the number of decision points. It also reduces the number of instructions that the user must receive and comprehend. For institutions that rely heavily on customer service, such as airlines and insurance companies, ASR makes it possible to reduce the number of human call-center employees. Those people can then be trained for other jobs that are more profitable and interesting, such as complaint resolution, customer retention, or sales.

The technology of speech recognition has been around for some time. It is improving, but problems still exist. An ASR system cannot always correctly recognize the input from a person who speaks with a heavy accent or dialect, and it has major problems with people who combine words from two languages by force of habit. Marginal cell-phone connections can cause an ASR system to misinterpret the input.

TTS is a type of speech synthesis application that is used to create a spoken sound version of the text in a computer document, such as a help file or a web page. TTS can enable the reading of computer display information for the visually challenged person, or may simply be used to augment the reading of a text message. Current TTS applications include voice-enabled e-mail and spoken prompts in voice response systems. TTS is often used with voice recognition programs.

SUMMARY

In conventional voice portals resource (e.g., ASR and TTS ports) distribution is lacking. Administrators are required to make several difficult decisions. The first is whether to buy enough resources to handle unrealistic worse case scenarios. Typically this is financially unfeasible. For example if 10 MPPs could each handle 100 telephony ports this would mean that the customer would need to buy 1000 ASR resources—even though they expect never to get more than 600 calls which simultaneously needs ASR. This can occur because based on incoming call distribution the ASR load on the MPPs may become unbalanced (MPP1 may actually need 100 ASR resources yet MPP2 may only need 30). Designing for This burden is oftentimes financially untenable.

The next decision is whether or not to dedicate ASR resources to a specific MPP or to treat them as a pool of resources. If resources are dedicated to an MPP then as the example above shows one could get into a situation where resources are available on one MPP but not on the MPP which needs it.

If resources are shared and there are a limited number of resources (fewer ASR ports than MPP ports) then how these resources are efficiently shared across MPPs must be decided. In practice today this is done by a resource being pulled from a global pool, used and then released back to the pool. This occurs after each use. Unfortunately this terribly inefficient especially if the rate of acquisition is high and the cost of acquisition (typically measured in time) is high.

This problem becomes especially difficult when there are some resources which are unequal—unequal in that both will meet the criterion but maybe one is more expensive than the other or one is a better fit. For example an ASR server which can understand English is cheaper than one that can understand English and French; however if all the English only resources are being used it would be better to pick a port from the English-French recognizer rather than acquire no resources at all.

Embodiments of the invention significantly overcome such deficiencies and provide mechanisms and techniques that provide automatic speech recognition and text to speech distribution. By way of the present invention, administrators now only need to know the total number of telephony ports and the total number of similar speech resources. Similar speech resources are speech resources which, in the case of ASR, have the same language characteristics (English only, English and French, . . . ) or, in the case of TTS, language/voice characteristics (English-Mara). A collection of similar speech resources can be called an "ASR set" or a "TTS set". Collectively these are called a resource set.

In a particular embodiment of a method for providing resource distribution, the method includes determining a number of ports to hold (H) as needed for each Multi Media Platform (MPP). The method further includes determining a maximum number of ports that can be acquired (M) for each MPP Think of H as being a MPPs 'fair share' of ports and B=M−H being the number of ports than an MPP can 'borrow' from another MPP. The method additionally includes allocating ports for an MPP from at least one server in accordance with the number of ports to hold as needed and the number of ports that can be borrowed.

Other embodiments include a computer readable medium having computer readable code thereon for providing resource distribution. The computer readable medium includes instructions for determining a number of ports to hold (H) as needed for each Multi Media Platform (MPP). The computer readable medium further includes instructions for determining the maximum number of ports that can be acquired (M) for each MPP. The computer readable medium additionally includes instructions for allocating ports for an MPP from at least one server in accordance with the number of ports to hold as needed and the number of ports that can be borrowed.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides resource distribution as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing resource distribution as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The present invention provides mechanisms and techniques that provide automatic resource distribution. As stated above, while the following description gives examples using resources such as ASR resources and TTS resources, the present invention should not be limited to only ASR and TTS resources. Other resources, including but not limited to, video resources, speaker verification resources, telephony ports and network bandwidth are also within the scope of the present invention.

By way of the present invention, administrators now only need to know the total number of telephony ports and the total number of similar speech resources. Similar speech resources are speech resources which have the same language characteristics (English only, English and French, . . . ) or language/voice characteristics (English-Mara).

A collection of similar speech resources can be called an "ASR set" or a "TTS set". Collectively these are called a resource set.

The following conventions will be used when describing system components:

Tel[*]=Total number of telephony resources in the VP system

ASR[0]=Total number of ASR ports on ASR server 0

ASR[*]=Total number of ASR ports in the VP system

ASR[English,*]=Total number of ASR ports in the English language set.

Tel[0]=Total number of telephony resources on Media Processing Platform MPP0.

Each MPP needs two numbers for each resource server—H and M. H is the number of ports that a specific MPP can get and expect to hold (caveats to follow) and use and not starve another MPP. H is based on distributing the speech resources equally to MPP's based on MPP telephony port count. Note that since this first example is a single language system, the English dimension will be dropped for readability. M is the maximum number of ports that the MPP could need to satisfy a fully loaded system.

In the case where there are enough speech resources to satisfy a fully loaded system without multiplexing—ASR [*]= TTS[*]=Tel[*]. Therefore H=M and there is no need to multiplex ports.

Figure 1:
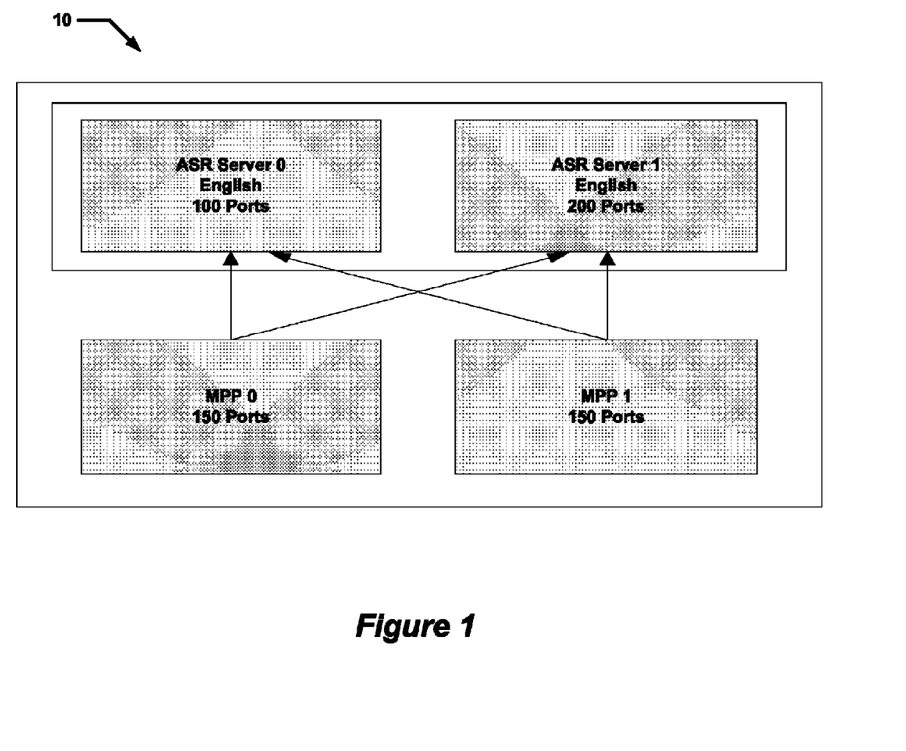
FIG. 1 illustrates a block diagram of a particular embodiment of a voice portal having ASR ports to be distributed.

Referring now to FIG. 1, a voice portal 10 is shown. Voice portal 10 includes two ASR servers, both English, one with 100 ports (ASR Server 0) and one with 200 ports (ASR Server 1). Therefore ASR[*]=300. Also shown are two MPPs each with 150 telephony ports, therefore Tel[*]=300. In this case there is no need to multiplex resources since there are a total of 300 ASR ports and 300 MPP ports.

Considering MPP0 with respect to ASR Server 0

$$H_0(ASR[0]) = \left(\frac{Tel[0]}{Tel[*]}\right) \times ASR[0] = \left(\frac{150}{300}\right) \times 100 = 50 \text{ ports}$$

Thus, MPP0 is allocated 50 ASR ports from ASR Server 0 and it can expect to hold onto these resources as long as it needs them.

Considering MPP0 with respect to ASR Server 1.

$$H_0(ASR[1]) = \left(\frac{Tel[0]}{Tel[*]}\right) \times ASR[1] = \left(\frac{150}{300}\right) \times 200 = 100 \text{ ports}$$

Thus, MPP0 is allocated 100 ASR ports from ASR 1.
Since MPP1 has the same number of ports as MPP0, the results are the same for MPP.

$H_1(ASR[0])=50$ $H_1(ASR[1])=100$

If there was no need to handle cases where there were insufficient speech resources, the problem would be mostly done; however there are cases where we may a need to 'share' resources and a node (MPP) is not guaranteed to receive all the ASR/TTS ports that it needs—this needs to be handled not only in cases where applications are evenly distributed. So for example if there are two MPPs it is possible for applications to get distributed such that one MPP may need many more ASR/TTS resources than the other. In this scenario it is unacceptable to simply evenly distribute the resources between the MPPs. Thus the introduction of M.

M is the maximum number of ports that a server should ever need to use. The thought is that when these is a need to multiplex ports, an MPP has 'the right' to H of them but permission to ask for more, one at a time, up to a maximum of M.

M is always greater than or equal to H and how M is calculated and how these extra ports are treated is discussed below.

M is calculated by examining the total number of speech resources and distributing them evenly based on MPP telephony port count. Consider the TTS example in FIG. 2 which requires multiplexing. In this example, voice portal 20 includes two TTS servers, TTS Server 0 having 100 ports and TTS Server 1 having 200 ports. Also in this example, MPP0 has 200 telephony ports while MPP1 has 300 telephony ports.

Figure 2:
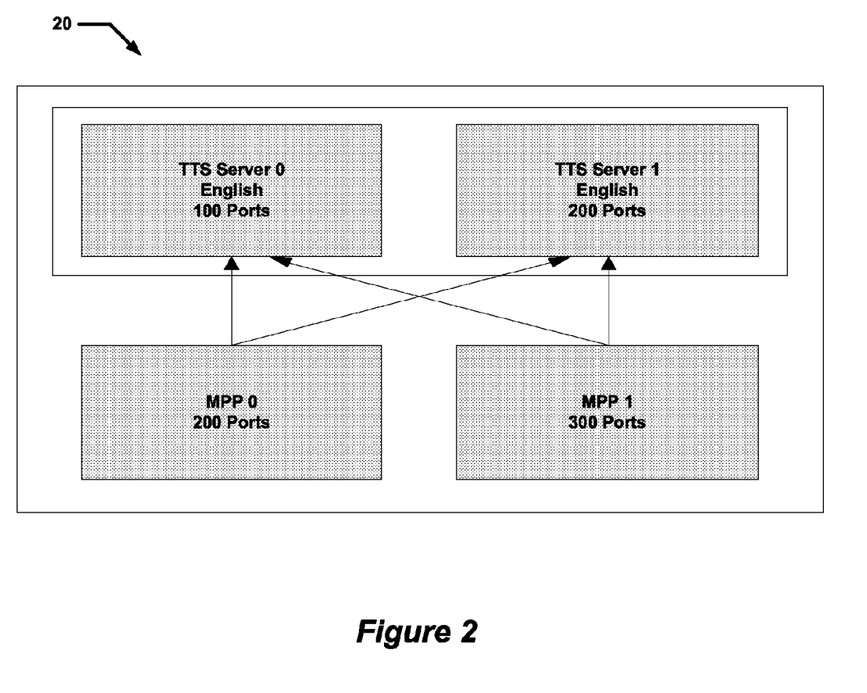
FIG. 2 illustrates a block diagram of a particular embodiment of a voice portal having TTS ports to be distributed.

For MPP0

$$M_0(TTS[0]) = \left(\frac{TTS[0]}{TTS[*]}\right) \times Tel(0) = \left(\frac{100}{300}\right) \times 200 = 67 \text{ ports}$$

$$M_0(TTS[1]) = \left(\frac{TTS[1]}{TTS[*]}\right) \times Tel(0) = \left(\frac{200}{300}\right) \times 200 = 134 \text{ ports}$$

$H_0$(TTS[0])=(200/500)*100=40 ports $H_0$(TTS[1])=(200/500)*200=80 ports

Finishing out the calculations for MPP1 yields this table

|  | TTS Server 0 | | | TTS Server 1 | | |
| --- | --- | --- | --- | --- | --- | --- |
|  | H | M | B | H | M | B |
| MPP0 | 40 | 67 | 27 | 80 | 134 | 54 |
| MPP1 | 60 | 100 | 40 | 120 | 200 | 80 |

Figure 3:
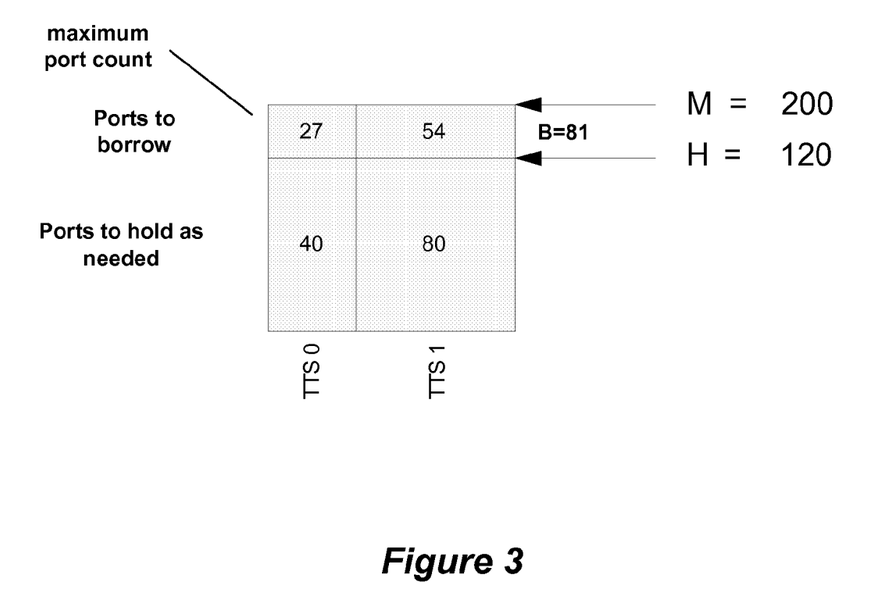
FIG. 3 shows the distribution of ports of the voice portal of FIG. 2 in accordance with embodiments of the invention.

Thus, MPP0 can hold and use 120 ports (40 from TTS 0 and 80 from TTS 1) as long as it needs them. However if TTS load gets high, MPP0 can borrow some from MPP1 if MPP1 is not using them—up to a total of 67 from TTS server 0 (actually MPP0 is borrowing only 67-40=27 additional ones) and 134 from TTS server 1. Since MPP0's telephony port count=200, MPP0 would never need>200 ports. This is shown in FIG. 3.

Essentially an MPP can hold its H ports as long as it needs them—i.e. in the case above if MPP0 needs 120 or more ports of TTS (in process or in queue) then it would hold on to them until that condition changes. If however the MPP0 load decreases and the MPP0 only needs to use 100 then the MPP0 would release 20 of these ports back into the global TTS pool. Practically speaking, when a protocol such as MRCP (media resource control protocol) is used, this may mean that 20 MRCP sessions are terminated. Limiting the rate at which MRCP sessions are created and destroyed has a direct influence on overall system performance and should be limited to as few as possible.

In this case the global TTS pool would terminate 20 Media Resource Control Protocol (MRCP) sessions resulting in the licenses going back to TTS Server 0 and/or TTS Server 1.

If however MPP0 has a need for that $121^{st}$ speech resource, it would request one from the global pool (actually taking away one of MPP1's; which would only happen if MPP1 had a need for fewer than 180 resources). This port however is handled differently in that if it is obtained then it must be immediately returned to the global pool. From an implementation standpoint this would mean that an MRCP session is created for the speak request, the speak request is satisfied and then the MRCP session is torn down.

In this case when you have more telephony ports in a single MPP than total speech resources M is greater than the number of speech resources available for a server. Consider the case of FIG. 4 wherein voice portal 30 includes two TTS servers, TTS Server 0 having 100 ports and TTS Server 1 having 200 ports. Also in this example, MPP0 has 2000 ports while MPP1 has 3000 ports.

Figure 4:
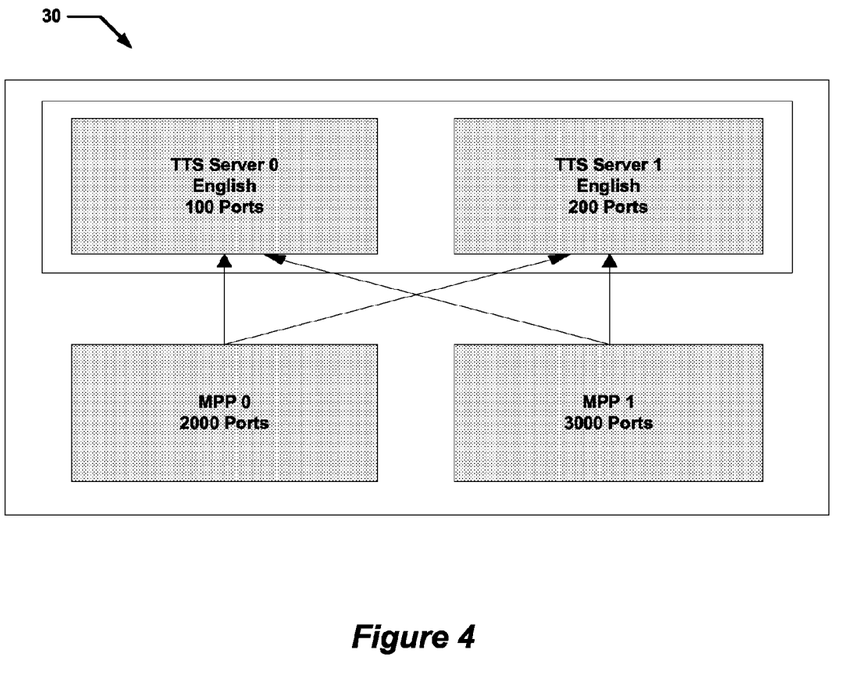
FIG. 4 illustrates a block diagram of a particular embodiment of a voice portal having TTS ports to be distributed wherein an MPP can handle more ports than the resource can provide.

Therefore for MPP0

$$H(TTS[0])=(2000/3000)*100=67 \text{ ports}$$

$$M(TTS[0])=(100/300)*2000=667 \text{ ports}$$

This shows that MPP0 would actually like to get up to 667 ports from TTS server 0 however that is not possible since the TTS server only contains 100 ports therefore the M equation needs to be modified to $$M(TTS[0]) = \text{Min}\left(\left(\frac{TTS[0]}{TTS[*]}\right) \times Tel(0), TTS[0]\right)$$

That is, an MPP cannot ever get more resources than there are speech ports on the server.

There may be scenarios where there are more than enough speech resources. This may happen when there are extra ASR resources so that if an ASR server fails there is no degradation in service. In such a case H is actually greater than M (more than the maximum amount needed . . . more than the number of telephony ports in the MPP). In this case H>M meaning an MPP can allocate and hold onto more ports than the maximum needed. In this case rather than decrease H, M is increased until they are equal. This once again changes the M equation and leaves the H equation alone. Thus $$M_0 TTS[0]) = \text{Max}\left(\text{Min}\left(\left(\frac{TTS[0]}{TTS[*]}\right) \times Tel(0), TTS[0]\right), H(TTS[0])\right)$$

Figure 5:
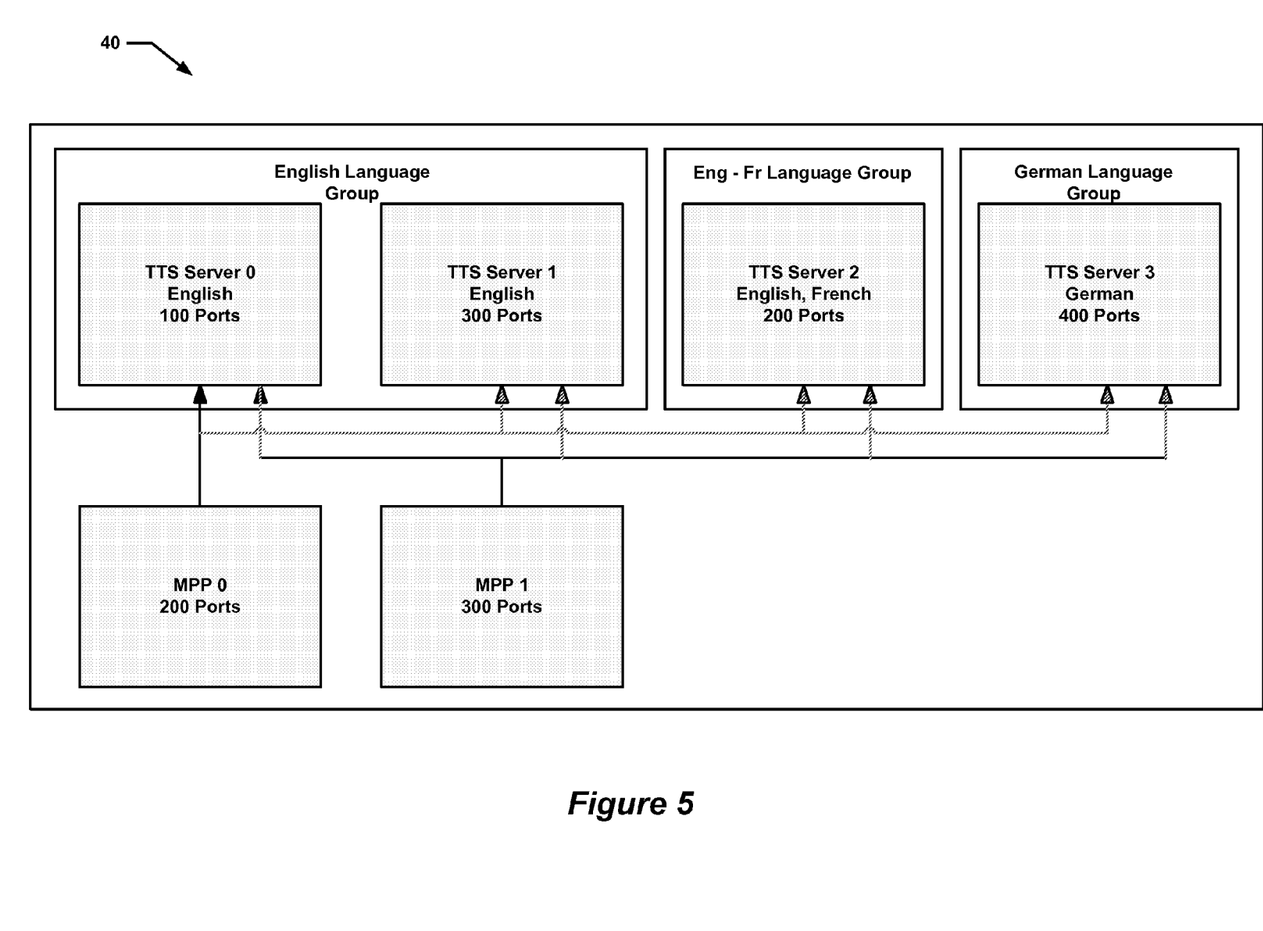
FIG. 5 illustrates a block diagram of a particular embodiment of a voice portal having TTS ports belonging to different language groups to be distributed.

All of the above have considered that there is a single 'language group'. If multiple language groups are available they are considered independently at this level, as shown in FIG. 5. Here, voice portal 40 includes an English language group of TTS servers 42, TTS Server 0 having 100 ports and TTS Server 1 having 300 ports. Also shown in an English/French language group 44 including TTS Server 2 having 200 ports and a German language group 46 including TTS Server 3 having 400 ports. Also in this example, MPP0 has 200 ports while MPP1 has 300 ports.

For MPP0

$$H_0(TTS0) = \left(\frac{Tel[0]}{Tel[*]}\right) \times TTS[0] = \left(\frac{200}{500}\right) \times 100 = 40 \text{ ports}$$

$$H_0(TTS1) = \left(\frac{Tel[0]}{Tel[*]}\right) \times TTS[1] = \left(\frac{200}{500}\right) \times 300 = 120 \text{ ports}$$

$$H_0(TTS2) = \left(\frac{Tel[0]}{Tel[*]}\right) \times TTS[2] = \left(\frac{200}{500}\right) \times 200 = 80 \text{ ports}$$

$$H_0(TTS3) = \left(\frac{Tel[0]}{Tel[*]}\right) \times TTS[3] = \left(\frac{200}{500}\right) \times 400 = 160 \text{ ports}$$

$$M_0(TTS0) = \left(\frac{TTS[0]}{TTS[English, *]}\right) \times Tel[0] = \left(\frac{100}{400}\right) \times 200 = 50 \text{ ports}$$

$$M_0(TTS1) = \left(\frac{TTS[1]}{TTS[English, *]}\right) \times Tel[0] = \left(\frac{300}{400}\right) \times 200 = 150 \text{ ports}$$

$$M_0(TTS2) = \left(\frac{TTS[2]}{TTS[French, *]}\right) \times Tel[0] = \left(\frac{200}{200}\right) \times 200 = 200 \text{ ports}$$

$$M_0(TTS3) = \left(\frac{TTS[3]}{TTS[German, *]}\right) \times Tel[0] = \left(\frac{400}{400}\right) \times 200 = 200 \text{ ports}$$

TTS[French,*]=TTS[2] since there is only one server in the language set. Ditto for TTS[3].

Similar calculations can be carried out for MPP1.

An administrator should never need to decide how many resources are associated with an MPP, nor should he/she have to decide values for H and M. Rather the administrator can provide details of the speech resources available—their capabilities, languages, voices and capacities—and whether the system should allow the borrowing of ports between MPPs. In the case of Voice Portal, this information is entered via the Voice Portal Management System (VPMS) and the VPMS in turn communicates this information to each MPP in the Voice Portal system. Each MPP in turn can calculate appropriate values of H and M based on the algorithms included in this embodiment. If any of this information changes (for example if an MPP is taken out of service so that the total telephony port count changes) then the VPMS would update each of the MPPs and each MPP would recalculate values of H and M.

Figure 6A:
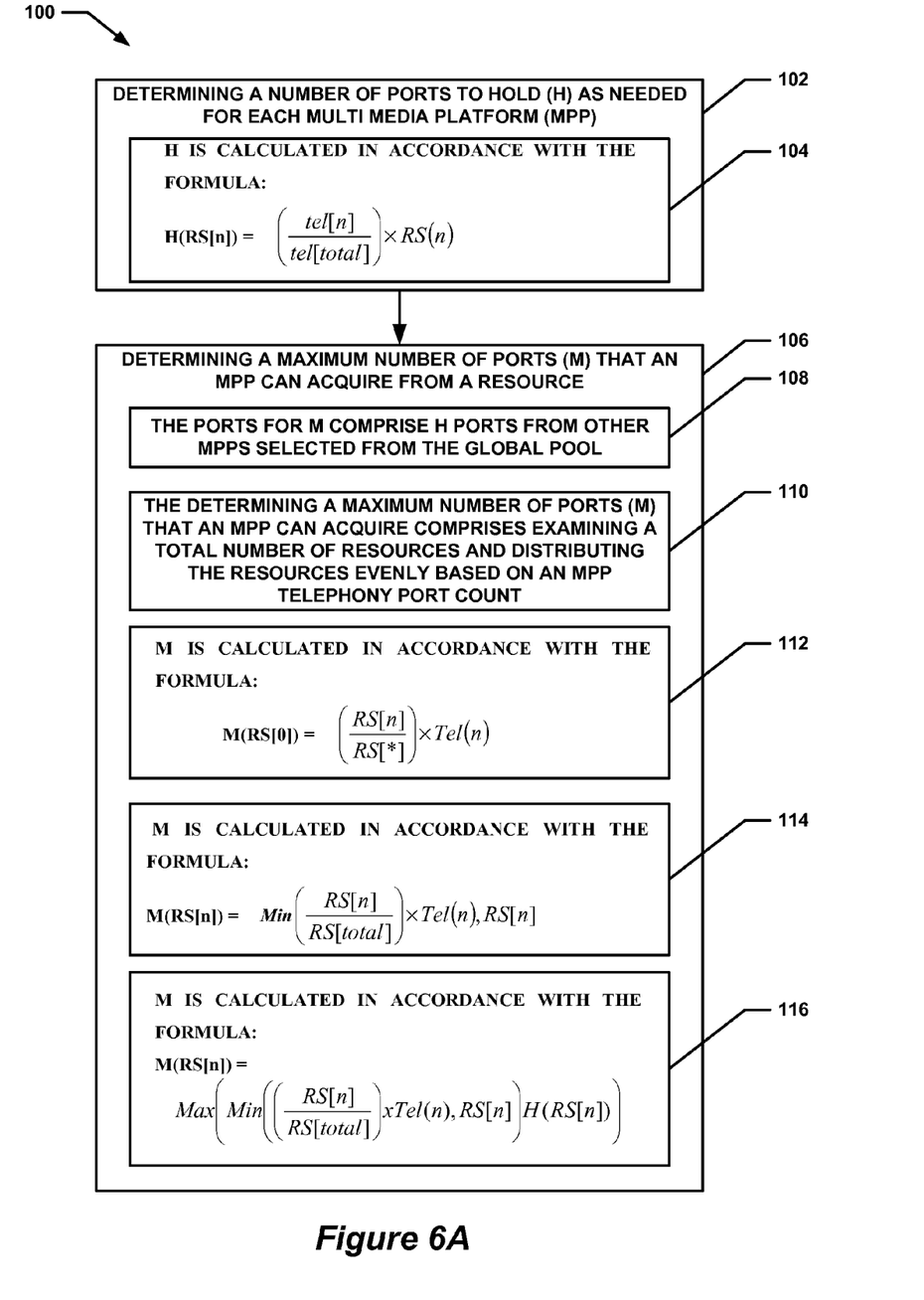
FIGS. 6A and 6B are flow diagrams of a method of performing automatic speech recognition and text to speech distribution in accordance with embodiments of the invention.
Figure 6B:
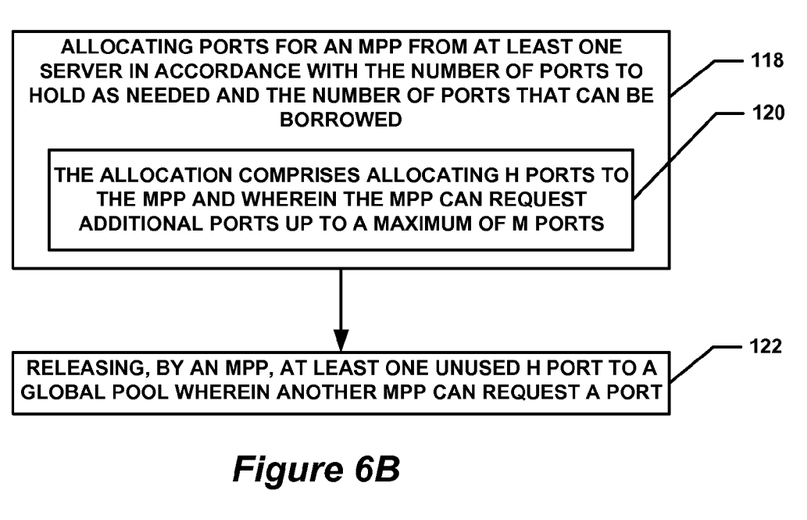

A flow chart of a particular embodiment of the presently disclosed method is depicted in FIGS. 6A and 6B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 6A and 6B, method 100 begins with processing block 102 which discloses determining a number of ports to hold (H) as needed for each Multi Media Platform (MPP). As shown in processing block 104 H is calculated in accordance with the formula:

$$H(RS[n]) = \left(\frac{tel[MPPx]}{tel[*]}\right) \times RS[n]$$

wherein H(RS[n]) is the H value to use for a particular resource server (e.g., a TTS Server, an ASR Server or the like) and wherein tel[MPPx] is a total number of telephony resources for an MPP, and tel(*) is the total number of telephony resources in the voice portal system and RS[n] is the total number of simultaneous sessions this resource can handle (for example the number of TTS streams that can be rendered at one time).

Processing block 106 states determining the maximum number of ports that can be acquired (M) for an MPP. As shown in processing block 108, the B additional (M=H+B) ports comprise H ports from other MPPs selected from the global pool. Processing block 110 recites the determining a number of ports that can be borrowed (B) comprises examining a total number of resources and distributing the resources evenly based on an MPP telephony port count.

Processing block 112 recites one embodiment wherein M is calculated in accordance with the formula:

$$M(RS[n]) = \left(\frac{RS[n]}{RS[*]}\right) \times tel(MPPx)$$

wherein M(RS[n]) is the M value to use for a particular resource server (e.g., a TTS Server, an ASR Server or the like) and wherein tel[MPPx] is a total number of telephony resources for an MPP, RS[n] is the capacity of speech resource 'n' and RS[*] is the total capacity of speech resources.

An alternate embodiment of calculating M is shown in processing block 114 which discloses M is calculated in accordance with the formula:

$$M(RS[n]) = \text{Min}\left[\left(\frac{RS[n]}{RS[*]}\right) \times tel(MPPx), RS[n]\right]$$

wherein M(RS[n]) is the M value to use for a particular resource server (e.g., a TTS Server, an ASR Server or the like) and wherein tel[MPPx] is a total number of telephony resources for an MPP, RS[n] is the capacity of speech resource 'n' and RS[*] is the total capacity of speech resources. In this case when you have more telephony ports in a single MPP than total speech resources, M would be greater than the number of speech resources available for a server, therefore the equation is modified as shown above such that an MPP cannot ever get more resources than there are speech ports on the server.

Yet another embodiment of calculating M is shown in processing block 116 which states M is calculated in accordance with the formula:

$$M(RS[n]) = \text{Max}\left(\text{Min}\left[\left(\frac{RS[n]}{RS[*]}\right) \times tel(MPPx), RS[n]\right], H(RS[n])\right)$$

wherein M(RS[n]) is the M value to use for a particular resource server (e.g., a TTS Server, an ASR Server or the like) and wherein tel[MPPx] is a total number of telephony resources for an MPP, RS[n] is the capacity of speech resource 'n' and RS[*] is the total capacity of speech resources. This covers the scenarios where there are more than enough speech resources. This may happen when there are extra (ASR/TTS) resources so that if one resource server fails there is no degradation in service. In such a case H is actually greater than M (more than the maximum amount needed . . . more than the number of telephony ports in the MPP). In this case H>M meaning an MPP can allocate and hold onto more ports than the maximum needed. In this case rather than decrease H, M is increased until they are equal.

Processing continues with processing block 118 which discloses allocating ports for an MPP from at least one server in accordance with the number of ports to hold as needed and the number of ports that can be borrowed. As shown in processing block 120 the allocation comprises allocating H ports to the MPP and wherein the MPP can request additional ports up to a maximum of M ports. Processing block 122 states releasing, by an MPP, at least one unused H port to a global pool wherein another MPP can request a port.

Ports are released back to the global pool differently depending on whether they are the H ports or the additional borrowed ports. Borrowed ports can be thought of as single use ports in that they are returned to the pool after each use—an MPP cannot hold on to a borrowed port for more than one use. The H ports however can be held for as long as an MPP needs (or believes that it will need) the port. The following are examples of policies which may guide when an H port is returned to the global pool (this is not an exhaustive list at all):

Immediately return the port to the global pool if no work is pending for this resource.

After some configurable time period of no work pending— we believe this to be the most likely scenario.

Based on an adaptive schedule determined from prior history—for example if there is always a dramatic drop in usage at 3 am, resources could be dropped more readily at this time.

Based on a pre-determined schedule—i.e. all resources given up at midnight.

Figure 7:
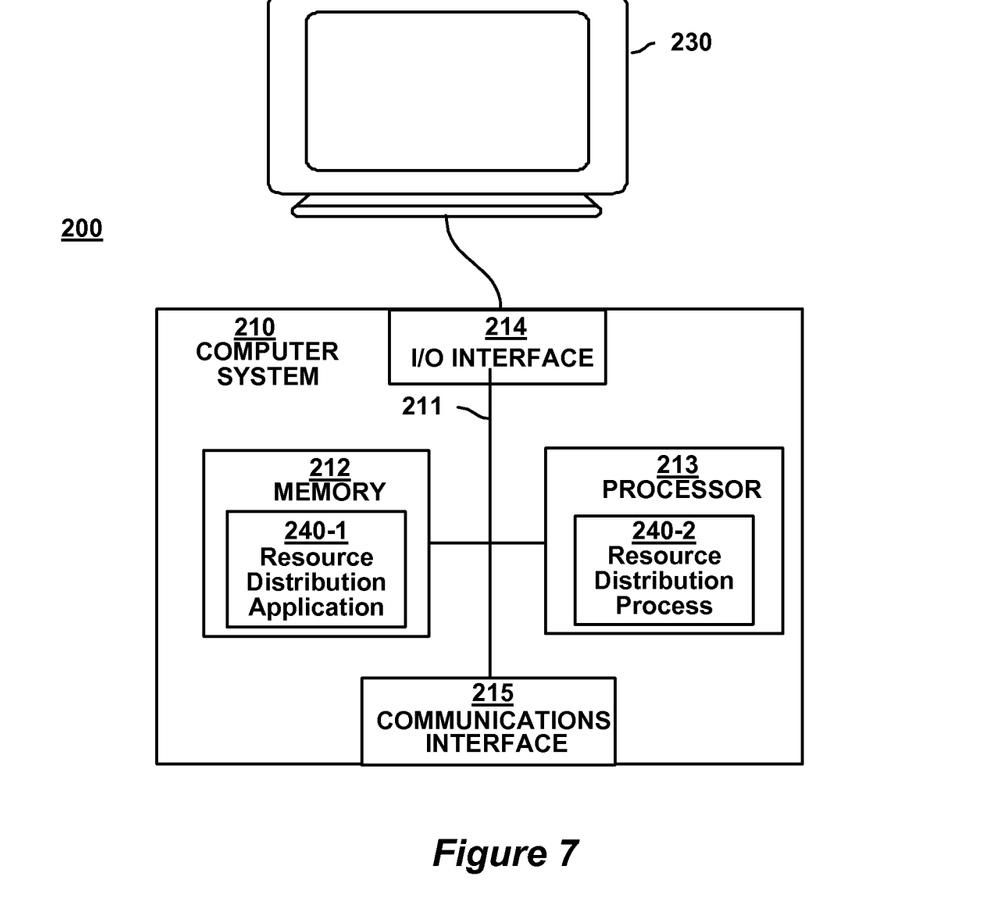
FIG. 7 illustrates an example computer system architecture for a computer system that performs resource distribution in accordance with embodiments of the invention.

FIG. 7 is a block diagram illustrating an example computer system 100 for implementing resource distribution function 140 and/or other related processes to carry out the different functionality as described herein.

As shown, computer system 200 of the present example includes an interconnect 211 that couples a memory system 212 and a processor 213 an input/output interface 214, and a communications interface 215.

As shown, memory system 212 is encoded with resource distribution application 240-1. Resource distribution application 240-1 can be embodied as software code such as data and/or logic instructions (e.g., code stored in the memory or on another computer readable medium such as a disk) that support functionality according to different embodiments described herein.

During operation, processor 213 of computer system 200 accesses memory system 212 via the interconnect 211 in order to launch, run, execute, interpret or otherwise perform the logic instructions of the resource distribution application 240-1. Execution of resource distribution application 240-1 produces processing functionality in resource distribution process 240-2. In other words, the resource distribution process 240-2 represents one or more portions of the resource distribution application 240-1 (or the entire application) performing within or upon the processor 213 in the computer system 200.

It should be noted that, in addition to the resource distribution process 240-2, embodiments herein include the resource distribution application 240-1 itself (i.e., the unexecuted or non-performing logic instructions and/or data). The resource distribution application 240-1 can be stored on a computer readable medium such as a floppy disk, hard disk, or optical medium. The resource distribution application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of resource distribution application 240-1 in processor 213 as the resource distribution process 240-2. Those skilled in the art will understand that the computer system 200 can include other processes and/or software and hardware components, such as an operating system that controls allocation and use of hardware resources associated with the computer system 200.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
   determining a number of ports to hold (H) as needed for each Multi Media Platform (MPP), wherein H is determined based upon a total number of telephony resources for an MPP, a total number of telephony resources in a voice portal system and a total number of simultaneous sessions a resource can handle;
   determining a number of ports that can be borrowed (M) for each MPP; and
   allocating ports for an MPP from at least one server in accordance with said number of ports to hold as needed and said number of ports that can be borrowed.

2. The method of claim 1 wherein said allocation comprises allocating H ports to said MPP and wherein said MPP can request additional ports up to a maximum of M ports.

3. The method of claim 1 further comprising releasing, by an MPP, at least one unused H port to a global pool wherein another MPP can request a port.

4. The method of claim 3 wherein said ports for M comprise H ports from other MPPs selected from said global pool.

5. The method of claim 1 wherein said determining a number of ports that can be borrowed (M) comprises examining a total number of resources and distributing said resources evenly based on an MPP telephony port count.

6. The method of claim 1 wherein H is calculated in accordance with the formula:

$$H(RS[n]) = \left(\frac{tel[MPPx]}{tel[*]}\right) \times RS[n]$$

wherein H(RS[n]) is the H value to use for a particular resource server and wherein tel[MPPx] is a total number of telephony resources for an MPP, and tel(*) is the total number of telephony resources in the voice portal system and RS[n] is the total number of simultaneous sessions this resource can handle.

7. The method of claim 1 wherein M is calculated in accordance with the formula:

$$M(RS[n]) = \left(\frac{RS[n]}{RS[*]}\right) \times tel(MPPx)$$

wherein M(RS[n]) is the M value to use for a particular resource server and wherein tel[MPPx] is a total number of telephony resources for an MPP, RS[n] is the capacity of speech resource 'n' and RS[*] is the total capacity of speech resources.

8. The method of claim 1 wherein M is calculated in accordance with the formula:

$$M(RS[n]) = \mathrm{Min}\left[\left(\frac{RS[n]}{RS[*]}\right) \times (MPPx), RS[n]\right]$$

wherein M(RS[n]) is the M value to use for a particular resource server and wherein tel[MPPx] is a total number of telephony resources for an MPP, RS[n] is the capacity of speech resource 'n' and RS[*] is the total capacity of speech resources.

9. The method of claim 1 wherein M is calculated in accordance with the formula:

$$M(RS[n]) = \mathrm{Max}\left(\mathrm{Min}\left(\left(\frac{RS[n]}{RS[*]}\right) \times tel(MPPx), RS[n]\right), H(RS[n])\right)$$

wherein M(RS[n]) is the M value to use for a particular resource server and wherein tel[MPPx] is a total number of telephony resources for an MPP, RS[n] is the capacity of speech resource 'n' and RS[*] is the total capacity of speech resources.

10. The method of claim 3 wherein said releasing is done in accordance with at least one policy selected from the group consisting of immediately return the port to the global pool if no work is pending for this resource, after some configurable time period of no work pending, based on an adaptive schedule determined from prior history, and based on a pre-determined schedule.

11. A non-transitory computer readable medium having computer readable code thereon for performing resource distribution, the medium comprising:
  instructions for determining a number of ports to hold (H) as needed for each Multi Media Platform (MPP), wherein H is determined based upon a total number of telephony resources for an MPP, a total number of telephony resources in a voice portal system and a total number of simultaneous sessions a resource can handle;
  instructions for determining a number of ports that can be borrowed (M) for each MPP; and
  instructions for allocating ports for an MPP from at least one server in accordance with said number of ports to hold as needed and said number of ports that can be borrowed.

12. The computer readable medium of claim 11 wherein said instructions for allocation comprises instructions for allocating H ports to said MPP and wherein said MPP can request additional ports up to a total maximum of M ports.

13. The computer readable medium of claim 11 further comprising instructions for releasing, by an MPP, at least one unused H port to a global pool wherein another MPP can request a port.

14. The computer readable medium of claim 13 wherein said ports for M comprise H ports from other MPPs selected from said global pool.

15. The computer readable medium of claim 11 wherein said instructions for determining the maximum number of ports that can be acquired (B), wherein B is the additional number of ports that can be borrowed and wherein B=M−H, comprises instructions for examining a total number of resources sand distributing said resources evenly based on an MPP telephony port count.

16. The computer readable medium of claim 11 wherein H is calculated in accordance with the formula:

$$H(RS[n]) = \left(\frac{tel[MPPx]}{tel[*]}\right) \times RS(n)$$

wherein H(RS[n]) is the H value to use for a particular resource server and wherein tel[MPPx] is a total number of telephony resources for an MPP, and tel(*) is the total number of telephony resources in the voice portal system and RS[n] is the total number of simultaneous sessions this resource can handle.

17. The computer readable medium of claim 11 wherein M is calculated in accordance with the formula:

$$M(RS[n]) = \left(\frac{RS[n]}{RS[*]}\right) \times tel(MPPx)$$

wherein M(RS[n]) is the M value to use for a particular resource server and wherein tel[MPPx] is a total number of telephony resources for an MPP, RS[n] is the capacity of speech resource 'n' and RS[*] is the total capacity of speech resources.

18. The computer readable medium of claim 11 wherein M is calculated in accordance with the formula:

$$M(RS[n]) = \mathrm{Min}\left[\left(\frac{RS[n]}{RS[*]}\right) \times tel(MPPx), RS[n]\right]$$

wherein M(RS[n]) is the M value to use for a particular resource server and wherein tel[MPPx] is a total number of telephony resources for an MPP, RS[n] is the capacity of speech resource 'n' and RS[*] is the total capacity of speech resources.

19. The computer readable medium of claim 11 wherein M is calculated in accordance with the formula:

$$M(RS[n]) = \text{Max}\left(\text{Min}\left(\left(\frac{RS[n]}{RS[*]}\right) \times tel(MPPx), RS[n]\right), H(RS[n])\right)$$

wherein M(RS[n]) is the M value to use for a particular resource server and wherein tel[MPPx] is a total number of telephony resources for an MPP of claim 1 wherein said allocation comprises allocating H ports to said MPP and wherein said MPP can request additional ports up to a maximum of M ports, RS[n] is the capacity of speech resource 'n' and RS[*] is the total capacity of speech resources.

20. A computer system comprising:
a memory;
a processor;
a communications interface;
an interconnection mechanism coupling the memory, the processor and the communications interface; and
wherein the memory is encoded with an application providing resource distribution, that when performed on the processor, provides a process for processing information, the process causing the computer system to perform the operations of:
determining a number of ports to hold (H) as needed for each Multi Media Platform (MPP), wherein H is determined based upon a total number of telephony resources for an MPP, a total number of telephony resources in a voice portal system and a total number of simultaneous sessions a resource can handle;
determining a number of ports that can be borrowed (M) for each MPP; and
allocating ports for an MPP from at least one server in accordance with said number of ports to hold as needed and said number of ports that can be borrowed.

21. The computer system of claim 20 wherein H is calculated in accordance with the formula:

$$H(RS[n]) = \left(\frac{tel[MPPx]}{tel[*]}\right) \times RS[n]$$

wherein H(RS[n]) is the H value to use for a particular resource server and wherein tel[MPPx] is a total number of telephony resources for an MPP, and tel(*) is the total number of telephony resources in the voice portal system and RS[n] is the total number of simultaneous sessions this resource can handle; and wherein M is calculated in accordance with one of the formulas selected from the group consisting of:

$$M(RS[n]) = \left(\frac{RS[n]}{RS[*]}\right) \times tel(MPPx)$$

wherein M(RS[n]) is the M value to use for a particular resource server and wherein tel[MPPx] is a total number of telephony resources for an MPP, RS[n] is the capacity of speech resource 'n' and RS[*] is the total capacity of speech resources $$M(RS[n]) = \text{Min}\left[\left(\frac{RS[n]}{RS[*]}\right) \times tel(MPPx), RS[n]\right]$$

wherein M(RS[n]) is the M value to use for a particular resource server and wherein tel[MPPx] is a total number of telephony resources for an MPP, RS[n] is the capacity of speech resource 'n' and RS[*] is the total capacity of speech resources; and $$M(RS[n]) = \text{Max}\left(\text{Min}\left(\left(\frac{RS[n]}{RS[*]}\right) \times tel(MPPx), RS[n]\right), H(RS[n])\right)$$

wherein M(RS[n]) is the M value to use for a particular resource server and wherein tel[MPPx] is a total number of telephony resources for an MPP claim 1 wherein said allocation comprises allocating H ports to said MPP and wherein said MPP can request additional ports up to a maximum of M ports and RS[n] is the capacity of speech resource 'n' and RS[*] is the total capacity of speech resources.

* * * * *